(12) United States Patent  
Chan

(10) Patent No.: US 8,157,581 B2
(45) Date of Patent: Apr. 17, 2012

(54) THERMAL MANAGEMENT METHOD AND DEVICE FOR POWERLINE COMMUNICATIONS

(75) Inventor: Tat Keung Chan, South San Francisco, CA (US)

(73) Assignee: Asoka USA Corporation, Santa Clara, CA (US)

( * ) Notice: Subject to any disclaimer, the term of this patent is extended or adjusted under 35 U.S.C. 154(b) by 1236 days.

(21) Appl. No.: 11/863,853

(22) Filed: Sep. 28, 2007

(65) Prior Publication Data

US 2008/0165463 A1 Jul. 10, 2008

Related U.S. Application Data

(60) Provisional application No. 60/884,011, filed on Jan. 8, 2007.

(51) Int. Cl.
*H01R 13/00* (2006.01)

(52) U.S. Cl. .................................... 439/485; 439/76.1

(58) Field of Classification Search ............ 439/76.1, 439/171, 173, 174, 485
See application file for complete search history.

(56) References Cited

U.S. PATENT DOCUMENTS

| | | | |
|---|---|---|---|
| 6,490,157 B2 * | 12/2002 | Unrein | 361/679.46 |
| 7,016,368 B2 | 3/2006 | Binder | |
| 7,035,280 B2 | 4/2006 | Binder | |
| 7,095,756 B2 | 8/2006 | Binder | |
| 7,377,113 B2 * | 5/2008 | Scalone | 60/775 |
| 2004/0268160 A1 * | 12/2004 | Atkinson et al. | 713/300 |
| 2005/0136972 A1 * | 6/2005 | Smith et al. | 455/554.1 |
| 2005/0152306 A1 * | 7/2005 | Bonnassieux et al. | 370/328 |
| 2005/0152337 A1 * | 7/2005 | Wurtzel et al. | 370/352 |
| 2005/0208825 A1 | 9/2005 | Chan | |
| 2006/0150819 A1 * | 7/2006 | Yuen | 96/224 |
| 2006/0176898 A1 | 8/2006 | Chan et al. | |
| 2006/0262478 A1 | 11/2006 | Chaudhry | |

OTHER PUBLICATIONS

International Search Report and Written Opinion of PCT Application No. PCT/US 08/50523, date of mailing Jun. 20, 2008, 8 pages total.

* cited by examiner

*Primary Examiner* — Gary F. Paumen
(74) *Attorney, Agent, or Firm* — Baker Botts L.L.P.

(57) ABSTRACT

A plug in power line module apparatus, e.g., removable to be for plug and play. The apparatus has a removable housing member, which has an outer region and an inner region. In a preferred embodiment, the housing member has a width, a length, and a depth. The apparatus has a first prong and a second prong extending from the removable housing member. The first prong and the second prong are adapted to couple into a power line outlet. In a preferred embodiment, the first prong and the second prong can be physically inserted into one or more different power outlets, e.g., U.S. standard, China standard, European standard, Japan standard. In a specific embodiment, the apparatus has a communication port coupled to the first prong and the second prong, the communication port. In a preferred embodiment, the communication port is for an Ethernet (i.e., CAT 5) connector, VoIP connector, or other communication devices. In a specific embodiment, the apparatus has a spatial volume provided by the width, length, and depth of the housing member.

20 Claims, 14 Drawing Sheets

TVS - Transient Voltage Suppressor

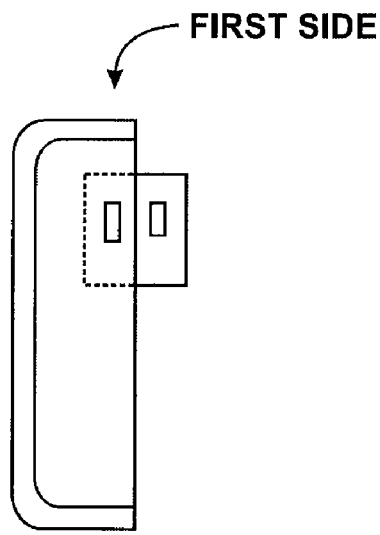
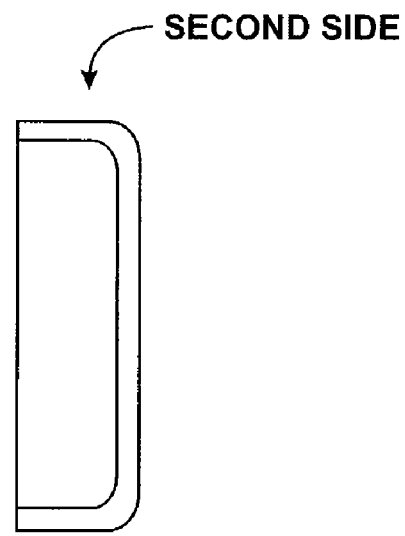
FIGURE 14        FIGURE 15
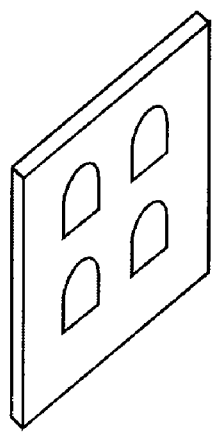
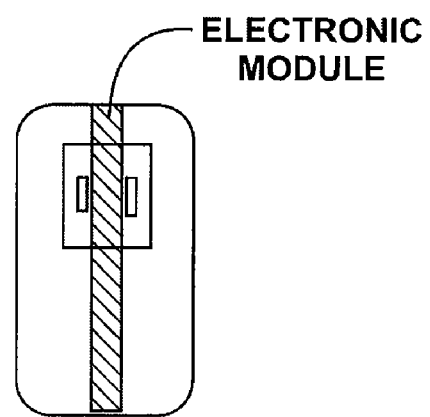
FIGURE 16        FIGURE 17

THERMAL MANAGEMENT METHOD AND DEVICE FOR POWERLINE COMMUNICATIONS

CROSS-REFERENCES TO RELATED APPLICATIONS

This patent application claims the benefit of priority from U.S. provisional patent application No. 60/884,011, filed on Jan. 8, 2007, which is incorporated by reference herein in its entirety.

BACKGROUND OF THE INVENTION

The present invention relates generally to power line networking techniques. In particular, particularly, the invention provides an apparatus for a high speed power line network using a power line device for a computing environment. More particularly, the invention provides a thermal management method and device for power line applications, which may be portable and/or allows for plug and play applications, and the like. Merely by way of example, the invention has been applied in a local area network environment, but it would be recognized that other applications exist. The invention can also be applied to building area networking, home networking, office networking, apartments, any combination of these, and other networking applications.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there has been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Power line Communication, commonly called PLC. Power line communication relies upon pre-existing power lines that are used to supply electrical power distributed through buildings, such as homes and office structures. Conventional PLC relies upon radio frequency technologies. Although power line communications have been successful in part, many limitations still exist.

For example, power line communication generally has limited capability due to lack of infrastructure. That is, power line networking has not been "mainstream," Power line networking has little or almost no infrastructure. Additionally, power line network devices are lacking and simply do not exist on a wide scale. In conventional office settings in the United States, power line networking is absent and almost non-existent. These and other limitations have been described throughout the present specification and more particularly below.

From the above, it is seen that improved techniques for power line networks are highly desired.

BRIEF SUMMARY OF THE INVENTION

According to the present invention, techniques for power line networking techniques are provided. In particular, particularly, the invention provides an apparatus for a high speed power line network using a power line device for a computing environment. More particularly, the invention provides a thermal management method and device for power line applications, which may be portable and/or allows for plug and play applications, and the like. Merely by way of example, the invention has been applied in a local area network environment, but it would be recognized that other applications exist. The invention can also be applied to building area networking, home networking, office networking, apartments, any combination of these, and other networking applications.

In a specific embodiment, the present invention provides a plug in power line module apparatus, e.g., removable to be for plug and play. The apparatus has a removable housing member, which has an outer region and an inner region. In a preferred embodiment, the housing member has a width, a length, and a depth. The apparatus has a first prong and a second prong extending from the removable housing member. The first prong and the second prong are adapted to couple into a power line outlet. In a preferred embodiment, the first prong and the second prong can be physically inserted into one or more different power outlets, e.g., U.S. standard, China standard, European standard, Japan standard. In a specific embodiment, the apparatus has a communication port coupled to the first prong and the second prong. In a preferred embodiment, the communication port is for an Ethernet (i.e., CAT 5) connector, VoIP connector, or other communication devices. In a specific embodiment, the apparatus has a spatial volume provided by the width, length, and depth of the housing member.

In a specific embodiment, the apparatus has an electronic module having a planar region disposed within the inner region. The planar region is characterized by module width and a module length of the planar region according to a specific embodiment. The planar region is substantially parallel to a surface region defined by the width and the length of the removable housing member. In a specific embodiment, the electronic module has a power line device adapted to process a data signal from a first format to a second format, and may have one or more other elements and/or devices that have been described throughout the present specification and more particularly below. In a specific embodiment, the present apparatus has a first set of air inlets and air outlets (e.g., openings) provided to allow thermal energy to traverse through the inner region and along the planar region of the electronic module while the first prong and the second prong are provided in a first power line outlet in a first direction. In a specific embodiment, the apparatus has a second set of air inlets and air outlets provided to allow thermal energy to traverse through the inner region and along the planar region of the electronic module while the first prong and the second prong are provided in a second power line outlet in a second direction. Depending upon the embodiment, there can also be other elements as well as other variations, modifications, and alternatives.

One or more benefits can be achieved using the present invention over conventional techniques. The present invention can be applied using conventional components from computer networking and hardware technologies. Additionally, the invention can be applied to pre-existing power line structures without substantial modification. Preferably, the present system and method are easy to implement and also allows for power line networking capabilities and power plug abilities using the same apparatus according to a specific embodiment. In a preferred embodiment, the present invention can provide an improved power line device that has multiple air inlets/outlets for thermal management of the internal components, e.g., powerline chip. In a specific embodiment, the device can be adapted to communicate at high data rates, e.g., 200 Megabits per second and greater. In a specific embodiment, the powerline may use the HomePlug AV Standard provided by the HomePlug® Powerline Alliance, Inc., which is hereby incorporated by reference for all purposes. Alternatively, powerline may be subject to original Homeplug Powerline Alliance, Inc. standard or others depending upon the specific embodiment. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 14 through 17 are simplified diagrams illustrating the assembly of the power plug module according to an embodiment of the present invention.

DETAILED DESCRIPTION OF THE INVENTION

According to the present invention, techniques for power line networking techniques are provided. In particular, particularly, the invention provides an apparatus for a high speed power line network using a power line device for a computing environment. More particularly, the invention provides a thermal management method and device for power line applications, which may be portable and/or allows for plug and play applications, and the like. Merely by way of example, the invention has been applied in a local area network environment, but it would be recognized that other applications exist. The invention can also be applied to building area networking, home networking, office networking, apartments, any combination of these, and other networking applications.

Figure 1:
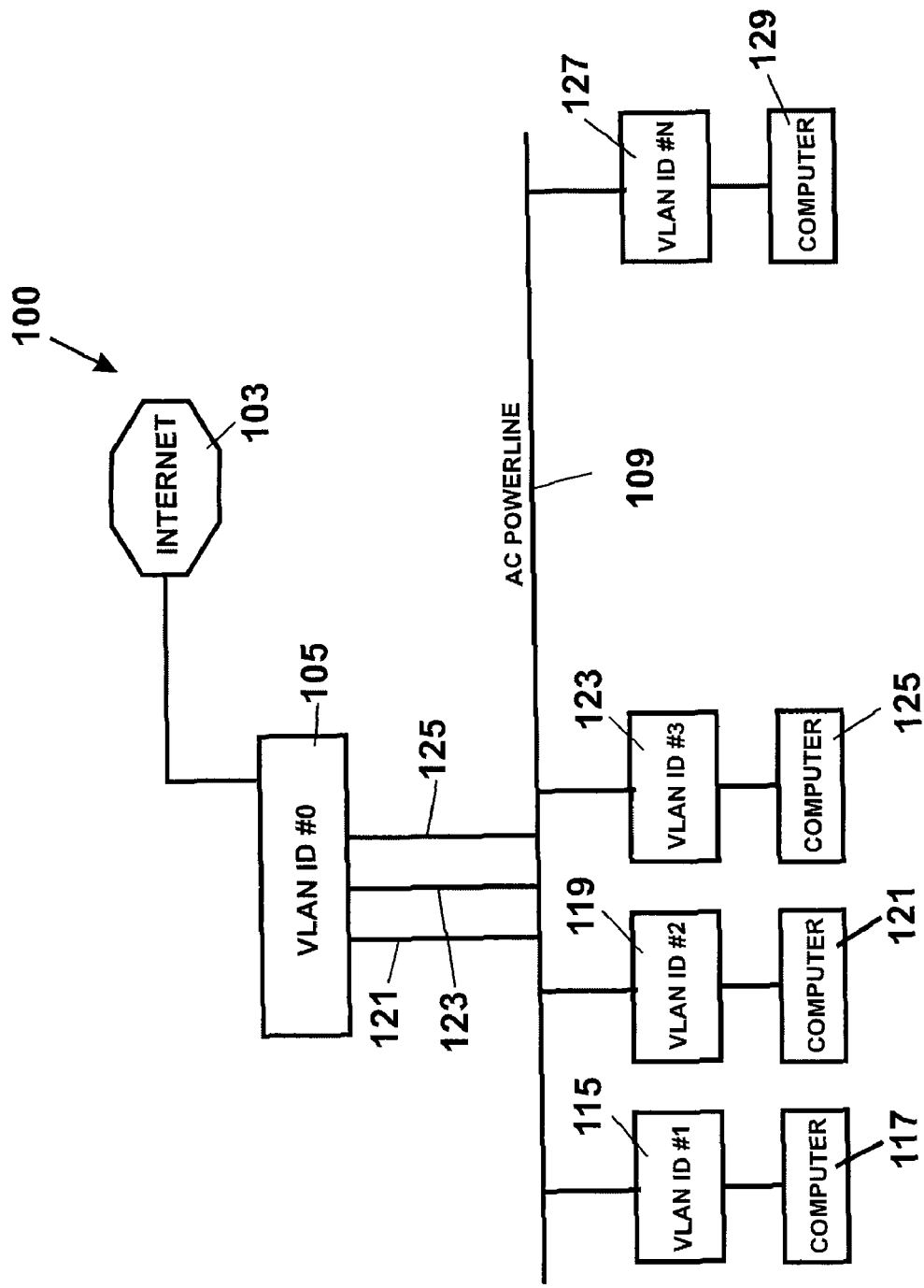
FIG. 1 is a simplified diagram of a power line system according to an embodiment of the present invention.

FIG. 1 is a simplified diagram of a power line system according to an embodiment of the present invention. This diagram is merely an example, which should not unduly limit the scope of the claims herein. One of ordinary skill in the art would recognize many variations, alternatives, and modifications. As shown, the system 100 for power line networking is included. The system 100 has an external data source 103, which is derived from a world wide networks of computers. As merely an example, the data source can be the Internet or other like entity. The system includes a first power line 121, a second power line 123, and a third power line 125, each of which corresponds to a phase. Each of the power lines is often bundled together and represented by reference numeral 111.

Referring again to FIG. 1, the system includes a gateway 115 coupled between the data source and an AC power line 109 according to a specific embodiment. The AC power line couples to a plurality of power line devices 115, 119, 123, 127 numbered from 1 through N, where N is an integer greater than 2, according to a specific embodiment. Each of the power line devices is coupled to a client device 117 or a plurality of client devices to define a "segment" on the power line network. As shown, power line device 119 couples to client device 121. Power line device 123 couples to client device 125. Power line device 127 couples to client device 129. Depending upon the specific embodiment, the client device can be a personal computer, a wireless device, a lap top computer, an Internet phone, an Internet appliance (e.g., refrigerator, stereo, television set, clock, digital paintings), any combinations of these, and others. Of course, one of ordinary skill in the art would recognize. Further details of the gateway and power line device can be found throughout the present specification and more particularly below.

Figure 2:
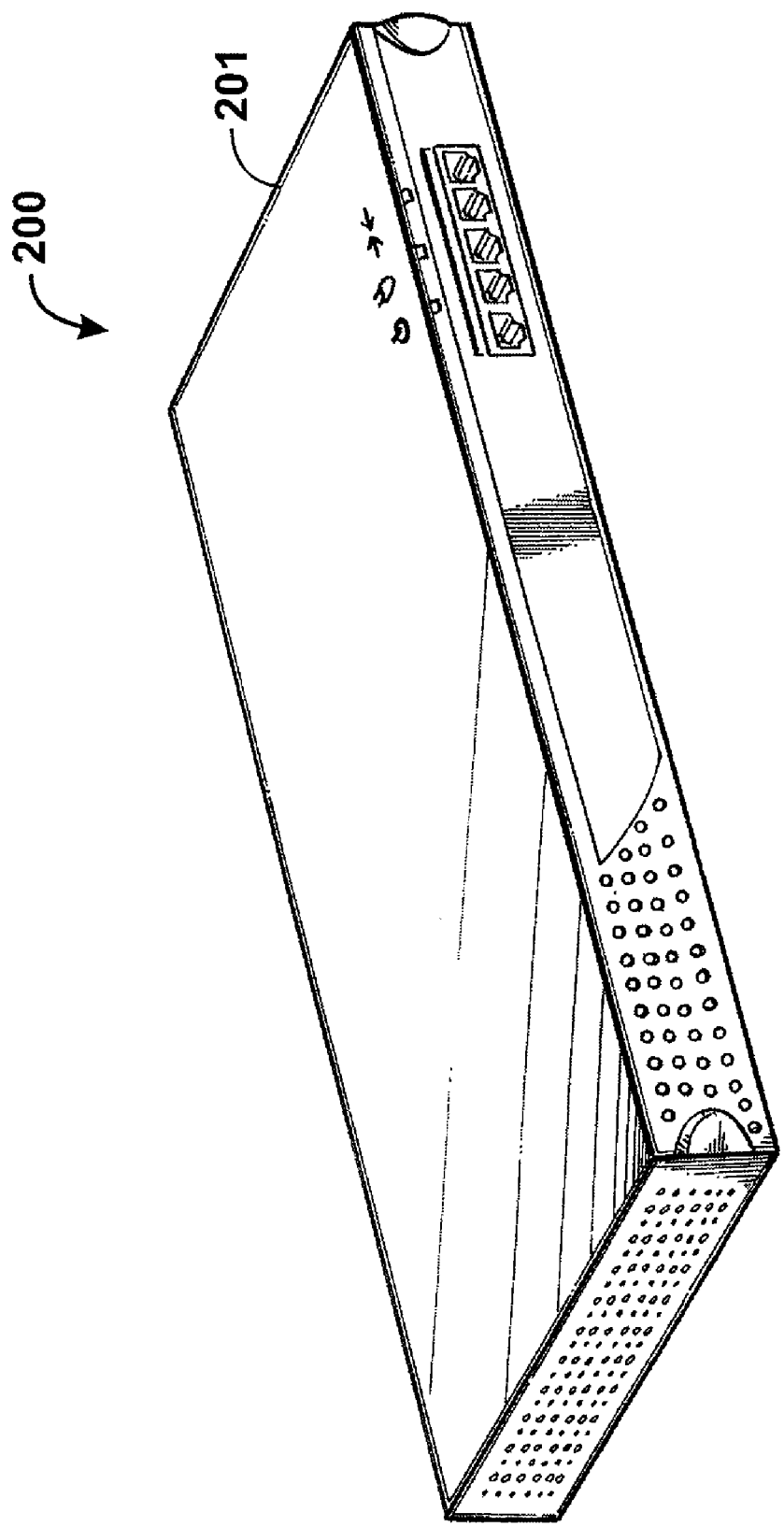
FIG. 2 is a simplified diagram of a power line gateway system according to an embodiment of the present invention.

FIG. 2 is a simplified diagram of a power line gateway system 200 according to an embodiment of the present invention. This diagram is merely an example, which should not unduly limit the scope of the claims herein. One of ordinary skill in the art would recognize many variations, alternatives, and modifications. As shown, the gateway system 200 has a housing 201 including at least three input/output ports 205, which can be coupled to external power lines according to a specific embodiment. In a specific embodiment, one or more power line signals is derived from the housing.

In a preferred embodiment, the power line signal coupled to each of the three input/output ports. That is, the power line signal is injected directly into each of the phases. In a specific embodiment, the present power line signal is injected directly into each of the phases, where the phases are not coupled to each other upon injection according to a specific embodiment. The three input/output ports include a first phase input/output port coupled to the first power line, a second phase input/output port coupled to the second power line, and a third input/output port coupled to the third power line. Of course, there can be other variations, modifications, and alternatives. Further details of the gateway system can be found throughout the present specification and more particularly below.

Figure 3:
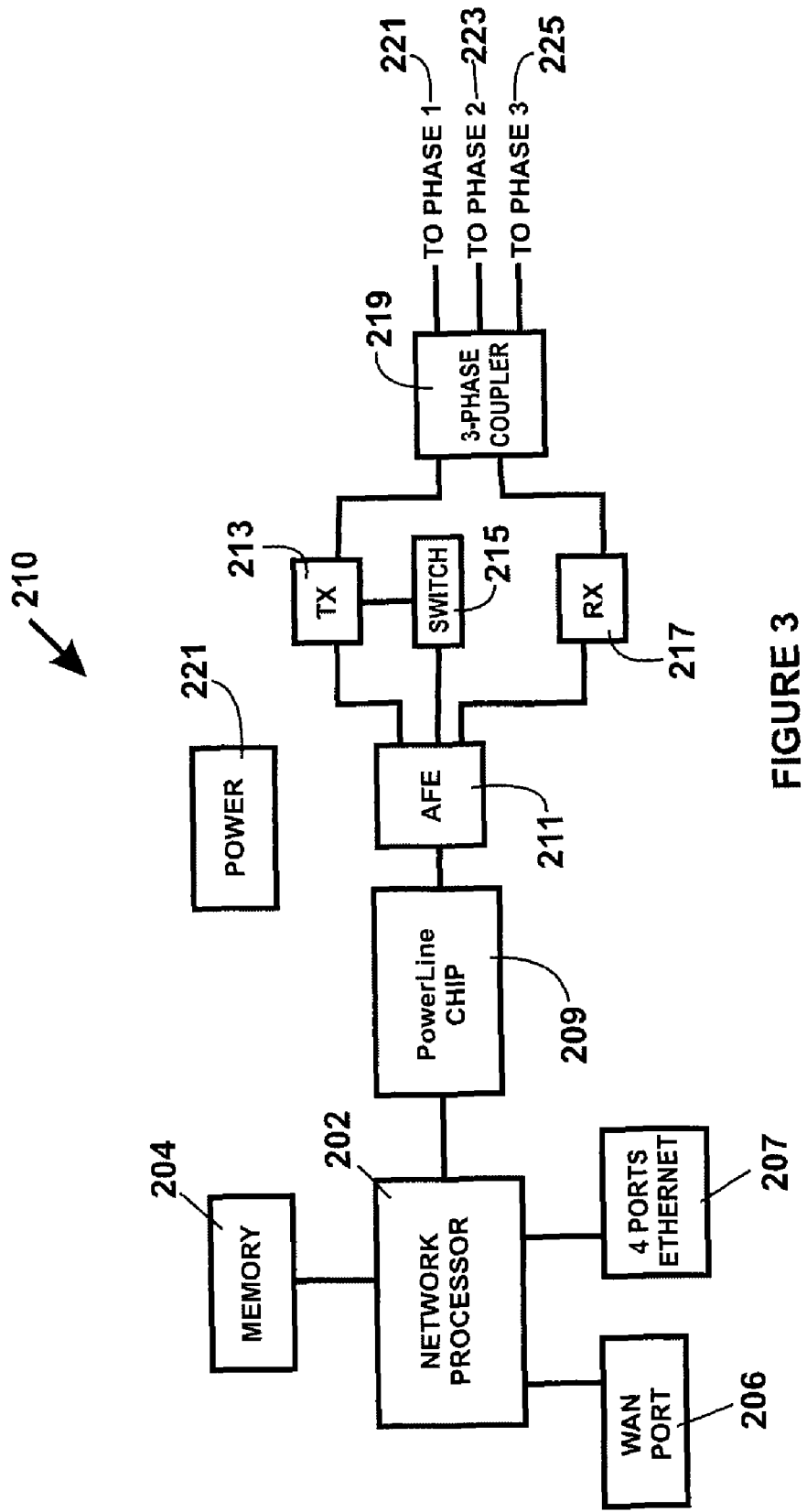
FIG. 3 is a simplified block diagram of the power line gateway system of FIG. 2 according to a specific embodiment.

FIG. 3 is a simplified block diagram 210 of the power line gateway system of FIG. 2 according to a specific embodiment. This diagram is merely an example, which should not unduly limit the scope of the claims herein. One of ordinary skill in the art would recognize many variations, alternatives, and modifications. As shown, the system has a network processor 202 within the housing and coupled to the power line signal via power line chip 209. In a specific embodiment, the network processor includes a network connector input/output port 206 coupled the network processor and coupled to the housing. In a preferred embodiment, the input/output port 206 couples to a data network, which couples to a wide area network and/or world wide area network, as noted. The network processor also includes one or more input/output ports for one or more local area networks 207. The network processor has an interface to a memory device 204, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. In a specific embodiment, the system also has a power module 221, which provides suitable power (e.g., voltage/current) to each of the elements described herein. Of course, one of ordinary skill in the art would recognize other variations, modifications, and alternatives.

In a preferred embodiment, the system has the power line chip 209, called herein "PLC" chip, which is coupled between the network processor and analog front end 211 device. As shown, the PLC is coupled to the analog front end (AFE) module 211. The AFE module interfaces between the chipset and a three phase coupler 219 according to a specific embodiment. Between the AFE and coupler is transmit 213 and receive 217 devices according to a specific embodiment. A switching device couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the three phase coupler can be any suitable device capable of injecting power line signals directly into each of the three phases 221, 223, 225 independently. In a specific embodiment, the coupler can be an inductive coupler and/or capacitive coupler, but may be others. In a preferred embodiment, each of the three phases receives/transmits power line signals directly (and are not coupled to each other at the gateway or within a vicinity of the gateway) to more efficient signal transfer and receive processes. As merely an example, the coupler can be either inductive and/or capacitive, but can be others. As noted, the three phase coupler is merely an example and should not unduly limit the scope of the claims herein.

Figure 4:
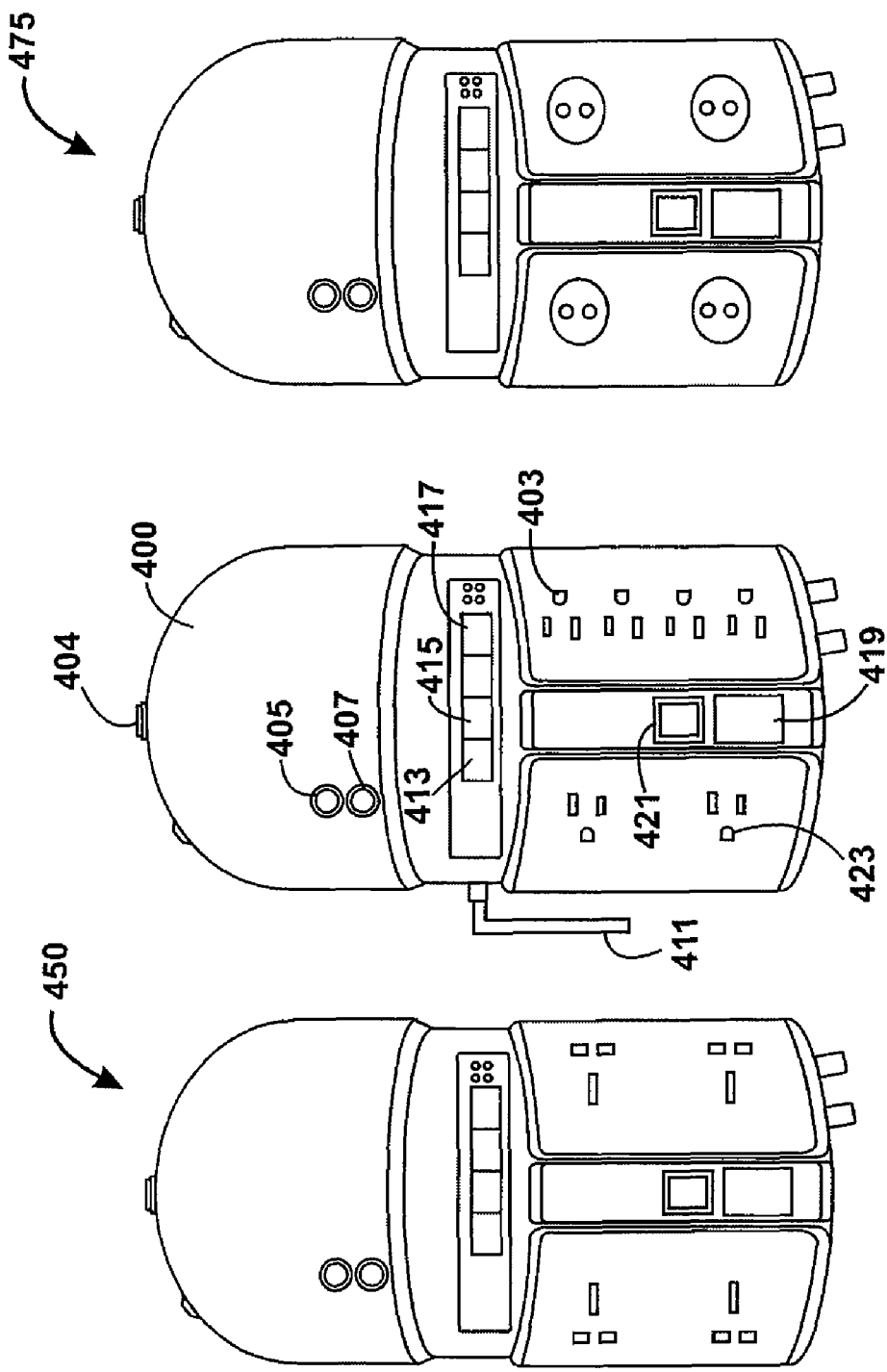
FIG. 4 is a simplified front view diagram of a power line strip (or strips) according to an embodiment of the present invention.

FIG. 4 is a simplified diagram of a power strip apparatus 400 according to an embodiment of the present invention. This diagram is merely an example, which should not unduly limit the scope of the claims herein. One of ordinary skill in the art would recognize many variations, alternatives, and modifications. As shown, the apparatus can be provided in housing 400, which can be stand alone according to a specific embodiment. As shown, the housing includes a power line device, which is provided in a module will be further described throughout the present specification and more particularly below. Various other elements are provided in the housing and/or enclosure according to an embodiment of the present invention.

In a specific embodiment, the powerline strip apparatus has input/output ports. Such input/output ports can include an RJ-11-type connector 413, an Ethernet connector 415 or connectors 415, 417, a wireless antenna 411, and others, if desired. The Ethernet connector often associated with a CAT 5-type connector. Each of these can be provided on a face of the apparatus. Of course, the connectors can also be provided on other spatial locations of the apparatus. The apparatus also includes one or more power outlets 403, 423 commonly termed AC outlets. The AC outlets are provided for AC power to any electronic devices that require such AC power. Depending upon the embodiment, one or more of the AC outlets 423 are "always on" and are not switched, after being plugged into the AC socket in a wall or other suitable location. In alternative embodiments, the AC outlets 403 are capable of being switched "on" or "off" via switching device 419, which is coupled between the AC outlets and power outlet cord 404 according to a specific embodiment. In a specific embodiment, the housing also has a switch 421 to turn "on" and turn "off" the power line module. The housing also has a DC power supply that provides power to the module. Each of these elements is provided within the housing, which includes at least the power outlet cord to be inserted into an AC power outlet provided in a power line network according to a specific embodiment. Of course, there can be other variations, modifications, and alternatives.

Figure 4A:
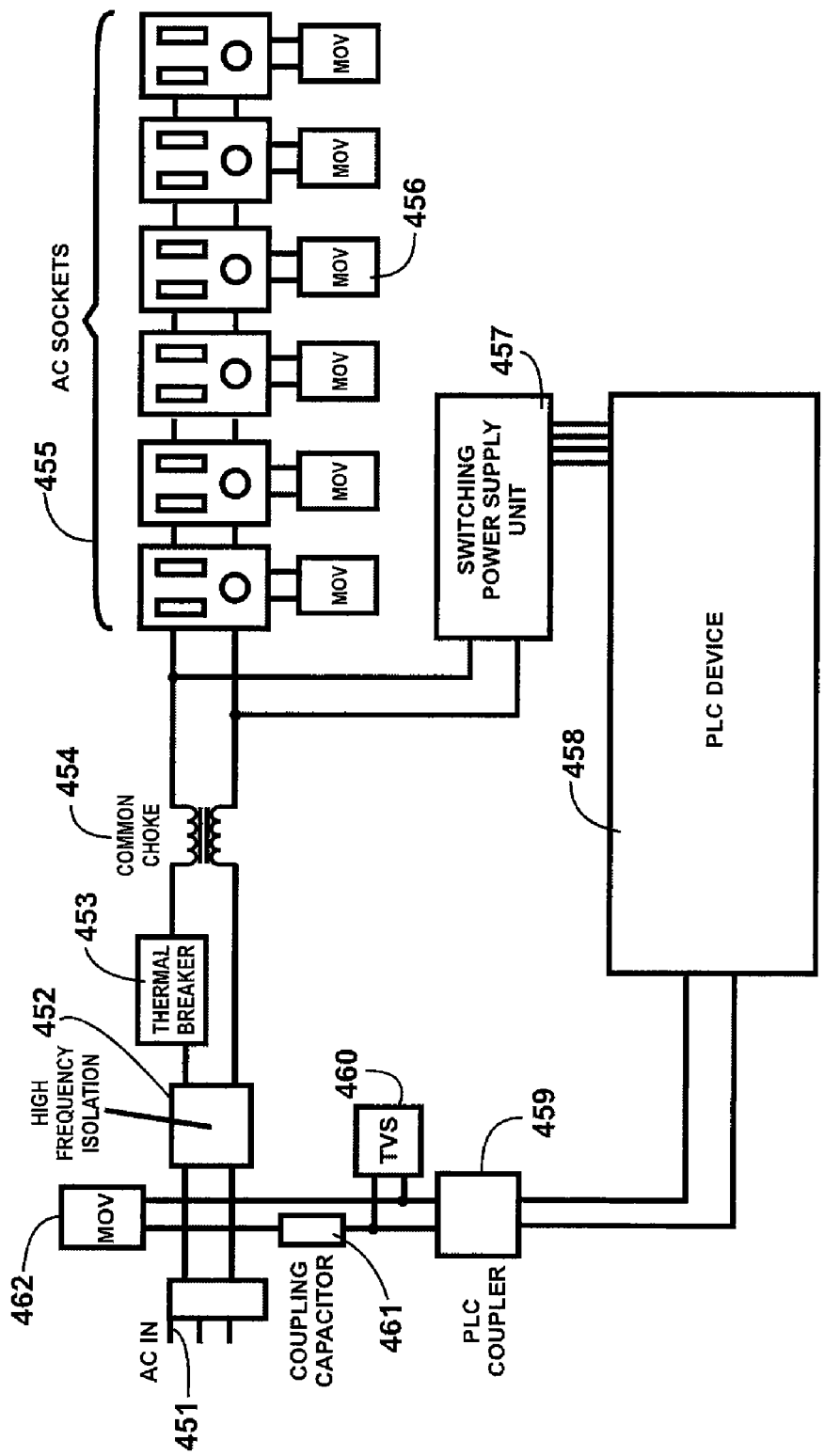
FIG. 4A is a simplified block diagram of a power line strip according to an embodiment of the present invention.

In a specific embodiment, the apparatus has a housing that is made of a suitable material such as a plastic or other material. The material can be molded and form the housing, which is often light weight and durable for use as a stand alone unit, which can be moved from one location to another. That is, the housing can be physically carried and provided in almost any type of physical environment. Depending upon the embodiment, the housing can be made using other types of outlet plugs, as shown in housing 450 and 475. In a specific embodiment, the various power strips include socket and power configurations suitable to meet country or regional standards, e.g., Japan, Europe, United States of America, China, Korea. Further details of the power strips can be found throughout the present specification and more particularly below. Of course, there can be other variations, modifications, and alternatives.

FIG. 4A is a simplified block diagram of a power line strip apparatus according to an embodiment of the present invention. This diagram is merely an example, which should not unduly limit the scope of the claims herein. One of ordinary skill in the art would recognize many variations, alternatives, and modifications. In a specific embodiment, the apparatus has a housing member, which includes an outer region and an inner region. The apparatus has an AC power line coupled to the housing member. In a specific embodiment, the AC power line includes a male connector device. Depending upon the embodiment, the AC power line can include two or three connectors, including power, ground, and neutral. Of course, there can be variations, modifications, and alternatives.

In a specific embodiment, the apparatus has a high frequency isolator 452 coupled between the power line and plurality of AC sockets 455. The high frequency isolator is adapted to remove high frequency noise that may be derived from the plurality of AC sockets, once one or more of them have been subjected to external power devices, e.g., computer, router, network equipment, display. In a specific embodiment, the apparatus also has a surge protector 453 coupled to the AC power line and AC sockets. In a specific embodiment, the surge protector is within a first portion of the inner region of the housing member. The surge protector can be any suitable design such as those manufactured by E-T-A USA at 1551 Bishop Court Mt. Prospect, Ill. 60056. In a specific embodiment, the apparatus also has a common choke 454, which is a coil. Of course, there can be other variations, modifications, and alternatives.

In a specific embodiment, the apparatus has one or more AC power outlets 455 coupled to the surge protector. In a specific embodiment, the one or more AC power outlets is spatially disposed on a first portion of the outer region of the housing member. An on/off switch is coupled between the one or more AC power outlets and the surge protector. In other embodiments, the AC power outlets are directly coupled to the power lines of the surge protector without any switch device to provide an "on" state. Of course, there can be other variations, modifications, and alternatives.

In a specific embodiment, the power line device 458 (or module) is coupled to the AC powerline. The power line device is adapted to process a data signal from the AC powerline in a first format to a second format according to a specific embodiment. The power line device has various outputs, including wireless, Ethernet, voice over IP, and others depending upon the embodiment. As also shown, the power line device is coupled to the incoming power line via transmit and receive lines. The device also has a coupling device 459 and capacitance coupler 461 according to a specific embodiment. The device also has a transient voltage suppressor 460 to reduce and/or suppress any electrostatic discharge influences according to a specific embodiment. Additionally, the device has various MOV devices 462 456 coupled to one or more portions of the AC power elements according to a specific embodiment. The MOV devices are provided for voltage clamping of high transient surge currents from sources, e.g., lighting, inductive load switching, or capacitor bank switching and other applications. An example of such MOV devices are those sold as UltraMOV™ Varistor Series Products from Littelfuse Inc., but can be others. A switching power supply 458 is coupled to the AC powerline and is provided after the common choke according to a specific embodiment. The switching power supply is adapted to convert an AC power signal into a DC signal for use with the power line device, as shown.

A multi-port switch (or switch device) can be coupled to or provided in the power line device according to a specific embodiment. The multi-port switch is adapted to couple to the data signal in the second format. In a specific embodiment, the multiport switch has a first output and an Nth output, where N is an integer greater than 1. Depending upon the embodiment, the input/outputs can be Ethernet, wireless, voice over IP, and other formats. In a specific embodiment, the power line device can also be provided with an external switch to turn it "on" and "off." Further details of the power line device can be found throughout the present specification and more particularly below.

Figure 5:
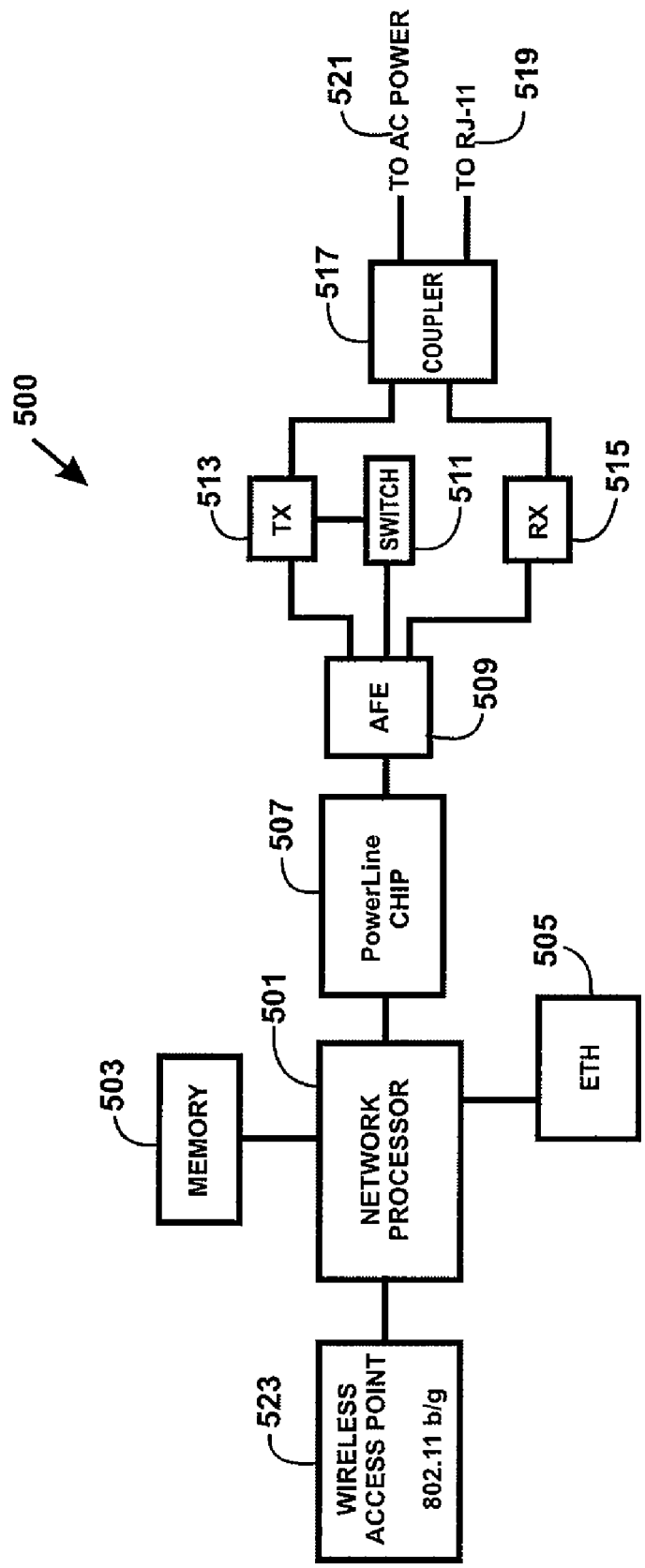
FIG. 5 is a simplified block diagram of a power line module for the power line strip according to an embodiment of the present invention.

FIG. 5 is a simplified block diagram of a power line module provided in the housing according to an embodiment of the present invention. This diagram is merely an example, which should not unduly limit the scope of the claims herein. One of ordinary skill in the art would recognize many variations, alternatives, and modifications. In a preferred embodiment, the module is provided within a interior region of the housing. As shown, the module has a network processor 501 within the housing and coupled to the power line signal via power line chip 507. In a specific embodiment, the network processor includes one or more input/output ports for one or more local area networks via line or lines 521. In a specific embodiment, the local area network can be Ethernet and/or other like technology. The network processor has an interface to a memory device 505, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. Of course, one of ordinary skill in the art would recognize other variations, modifications, and alternatives.

In a preferred embodiment, the system has the power line chip 507, called herein "PLC" chip, which is coupled between the network processor and an analog front end 509 device. As shown, the PLC is coupled to the analog front end (AFE) device and/or module. The AFE module interfaces between the PLC chip and a phase coupler 519 according to a specific embodiment. Between the AFE and coupler is transmit 513 and receive 515 devices according to a specific embodiment. A switching device 511 couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces 505, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the coupler 517 can be any suitable device capable of injecting and/or receiving power line signals to and/from a power line, which is coupled to a power line network. In a specific embodiment, the coupler can be an inductive coupler and/or capacitive coupler, but may be others. As merely an example, the coupler (either inductive and/or capacitive coupler), but can be others. The coupler couples to AC power line 521, which is provided on the powerline network. Additionally, the coupler or other coupling device is coupled to an RF-11 outlet 519 for telephone communication. Of course, there can be many variations, modifications, and alternatives.

In an optional specific embodiment, the network processor is also coupled to wireless access point device 523. The wireless access point device can be any suitable integrated circuit chip and/or chips, including modules, according to a specific embodiment. The wireless access point device can be an 802.11-type device or other type of wireless transmission/receive device according to a specific embodiment. The wireless access device is coupled to the wireless antenna according to a specific embodiment. Of course, there can be other variations, modifications, and alternatives.

Figure 6:
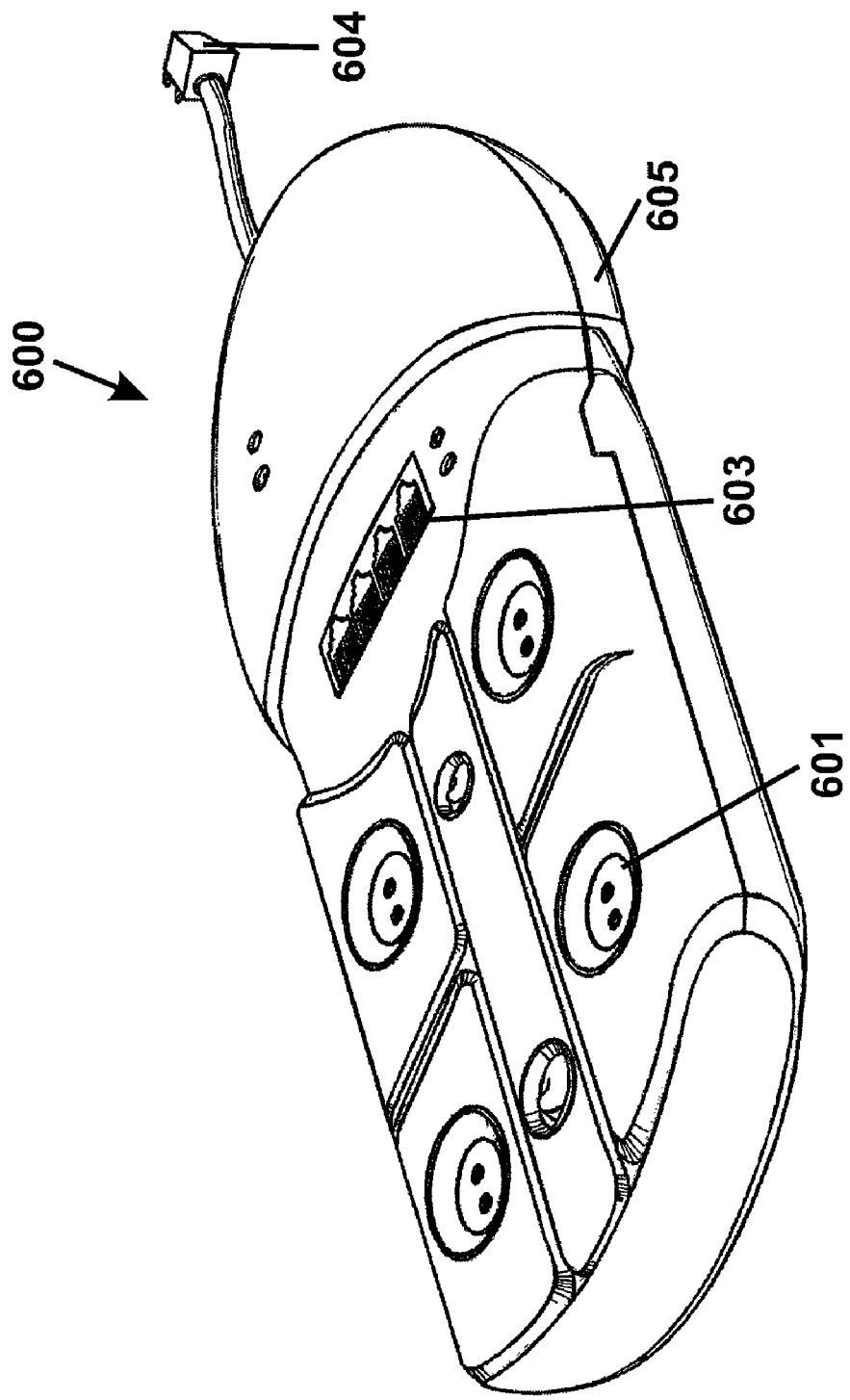
FIGS. 6 through 8 are simplified diagrams illustrating power strips according to an embodiment of the present invention.
Figure 7:
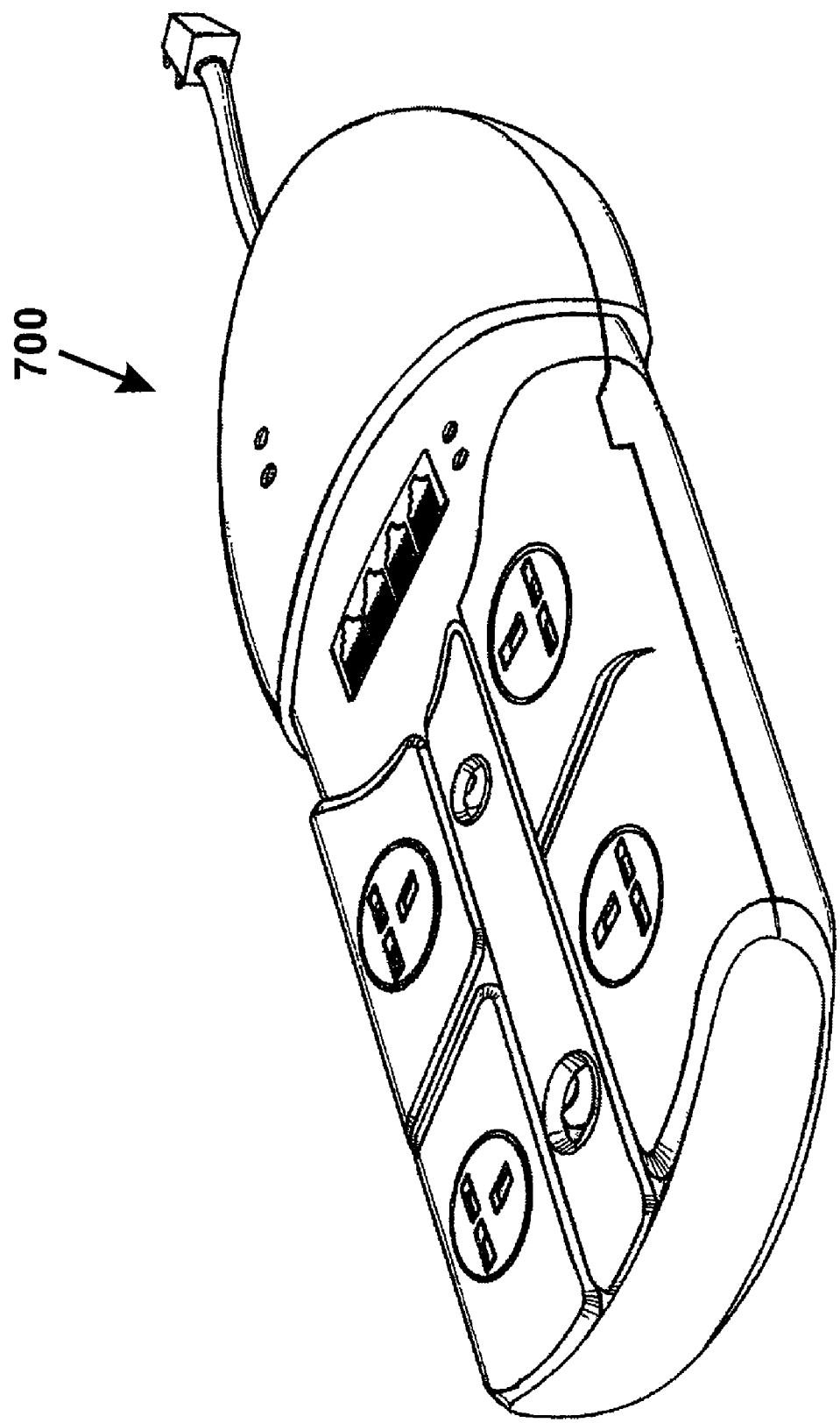
Figure 8:
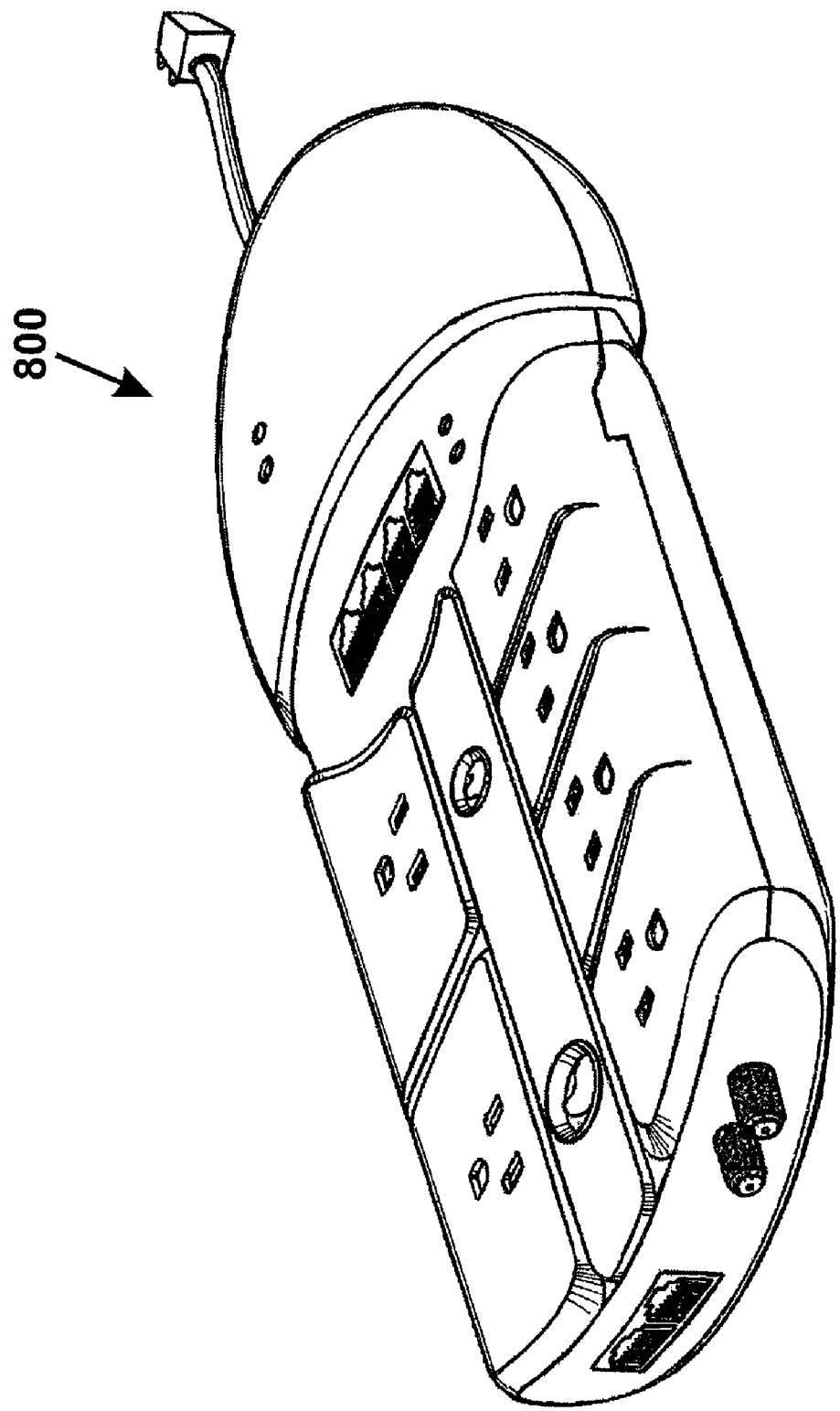

FIGS. 6 through 8 are simplified diagrams illustrating power strips according to embodiments of the present invention. These diagrams are merely examples, which should not unduly limit the scope of the claims herein. One of ordinary skill in the art would recognize many variations, modifications, and alternatives. As shown, the strip 600 includes a plurality of AC outlets 601 provided on a face portion of an enclosure 605 according to a specific embodiment. The enclosure also includes a plurality of Ethernet ports 603, which couple to cabling for networking applications. The power strip also has power plug 604, which couples to a power line network. Of course, there can be other variations, modifications, and alternatives.

Referring now to FIG. 7, the enclosure 700 includes a plurality of AC outlets provided on a face portion of an enclosure according to a specific embodiment. The enclosure also includes a plurality of Ethernet ports, which couple to cabling for networking applications. The power strip also has power plug, which couples to a power line network. Referring now to FIG. 8, the enclosure 800 includes a plurality of AC outlets provided on a face portion of an enclosure according to a specific embodiment. The enclosure also includes a plurality of Ethernet ports, which couple to cabling for networking applications. The power strip also has power plug, which couples to a power line network. The enclosure can include the powerline module, which has been previously described according to a specific embodiment. Other elements described here as well as outside of the specification and also be included. The enclosure can also include voice over IP, wireless, and other communication devices. Additionally, the enclosure, which is also a housing, can be made of any suitable material such as a firm plastic, which is insulating, or a combination of materials. As also noted, the various power strips include socket and power configurations suitable to meet country or regional standards, e.g., Japan, Europe, United States of America, China, Korea. Of course, there can be other variations, modifications, and alternatives.

Figure 9:
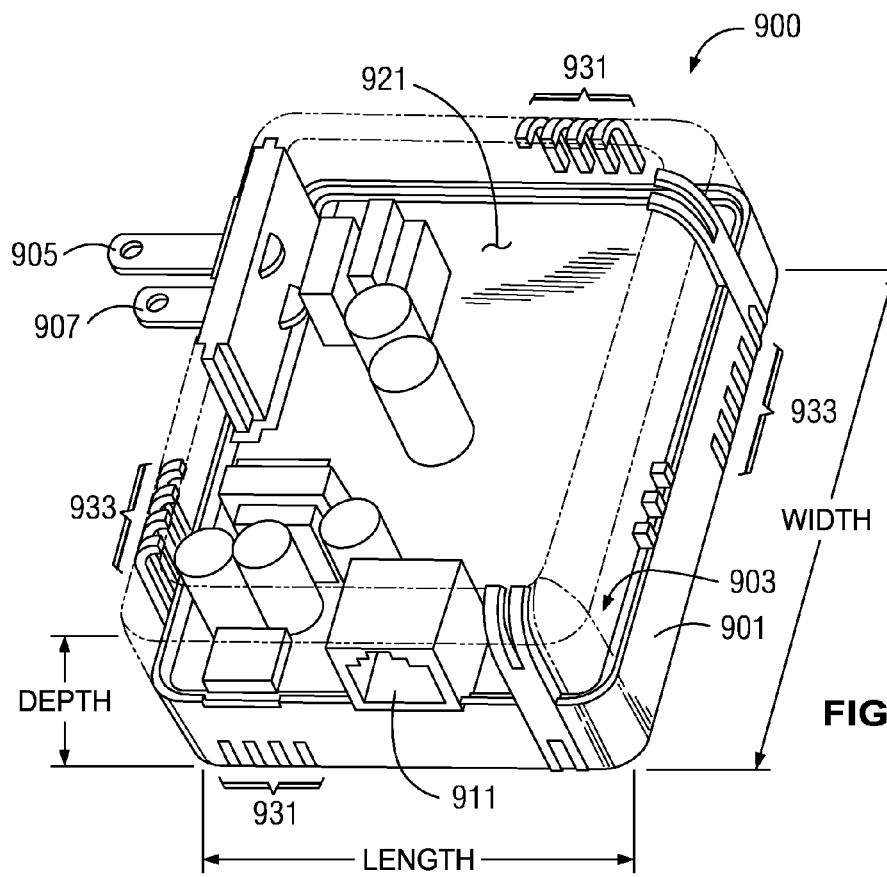
FIG. 9 is a simplified diagram illustrating a power plug module according to an alternative embodiment of the present invention.

FIG. 9 is a simplified diagram illustrating a power plug module according to an alternative embodiment of the present invention. This diagram is merely an example, which should not unduly limit the scope of the claims herein. One of ordinary skill in the art would recognize many variations, alternatives, and modifications. As shown is a plug in power line module apparatus, e.g., removable to be for plug and play, 900. The apparatus has a removable housing member, which has an outer region 901 and an inner region 903. In a preferred embodiment, the housing member has a width (W), a length (L), and a depth (D). In a specific embodiment, the depth is less than the length and/or width. Of course, there can be other variations, modifications, and alternatives.

In a specific embodiment, the apparatus has a first prong 907 and a second prong 905 extending from the removable housing member. In a specific embodiment, there can even be a third prong (not shown). The first prong 907 and the second prong 905 are adapted to couple into a power line outlet. In a preferred embodiment, the first prong 907 and the second prong 905 can be physically inserted into one or more different power outlets, e.g., U.S. standard, China 10 standard, European standard, Japan standard. In a specific embodiment, the apparatus has a communication port coupled to the first prong 905 and the second prong 907. In a preferred embodiment, the communication port 911 is for an Ethernet (i.e., CAT 5) connector, VoIP connector, or other communication devices. In a specific embodiment, the apparatus has a spatial volume provided by the width, length, and depth of the housing member.

In a specific embodiment, the apparatus has an electronic module 921 having a planar region disposed within the inner region. The planar region is characterized by module width and a module length of the planar region according to a specific embodiment. The planar region is substantially parallel to a surface region defined by the width and the length of the removable housing member. In a specific embodiment, the electronic module has a power line device adapted to process a data signal from a first format to a second format, and may have one or more other elements and/or devices that have been described throughout the present specification and/or outside of the present specification.

In a specific embodiment, the present apparatus has a first set of air inlets and air outlets 931 (e.g., openings) provided to allow thermal energy to traverse through the inner region and along the planar region of the electronic module while the first prong and the second prong are provided in a first power line outlet in a first direction. In a specific embodiment, the apparatus has a second set of air inlets and air outlets 933 provided to allow thermal energy to traverse through the inner region and along the planar region of the electronic module 921 while the first prong and the second prong are provided in a second power line outlet in a second direction. That is, the first set may also include openings from the second set and the other way around according to a specific embodiment. Depending upon the embodiment, there can also be other elements as well as other variations, modifications, and alternatives.

Figure 10:
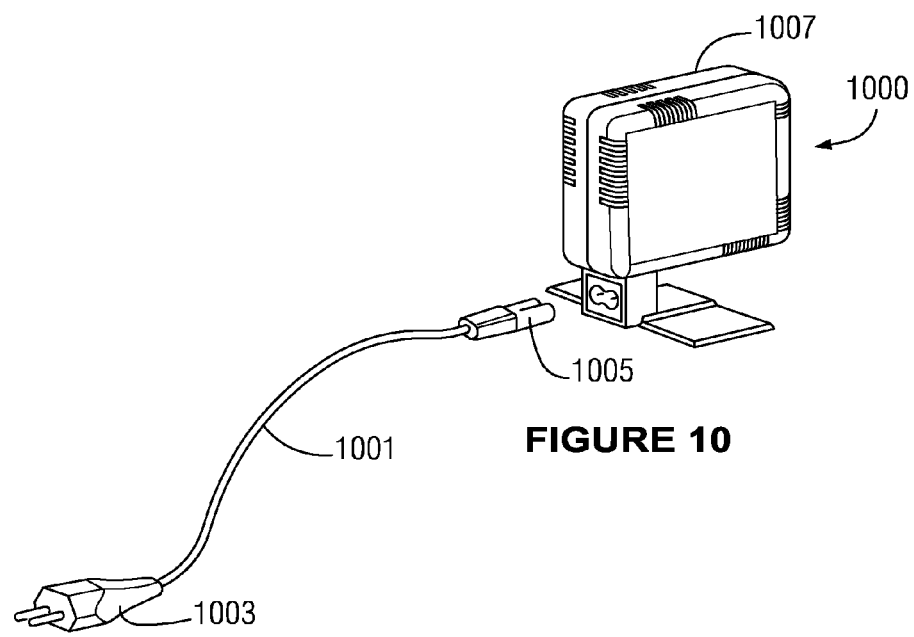
FIG. 10 is a simplified diagram illustrating the power plug module according to the alternative embodiment of the present invention.

FIG. 10 is a simplified diagram illustrating the power plug module 1000 according to the alternative embodiment of the present invention. This diagram is merely an example, which should not unduly limit the scope of the claims herein. One of ordinary skill in the art would recognize many variations, alternatives, and modifications. As shown, the module includes a detachable cable 1001, which includes a plurality of prongs 1001 on a first end and a female connector 1005 on a second end, which inserts into male connectors physically coupled to the housing, as shown. In a specific embodiment, the module also includes air flow input and output ports. Of course, there can be other variations, modifications, and alternatives.

Figure 11:
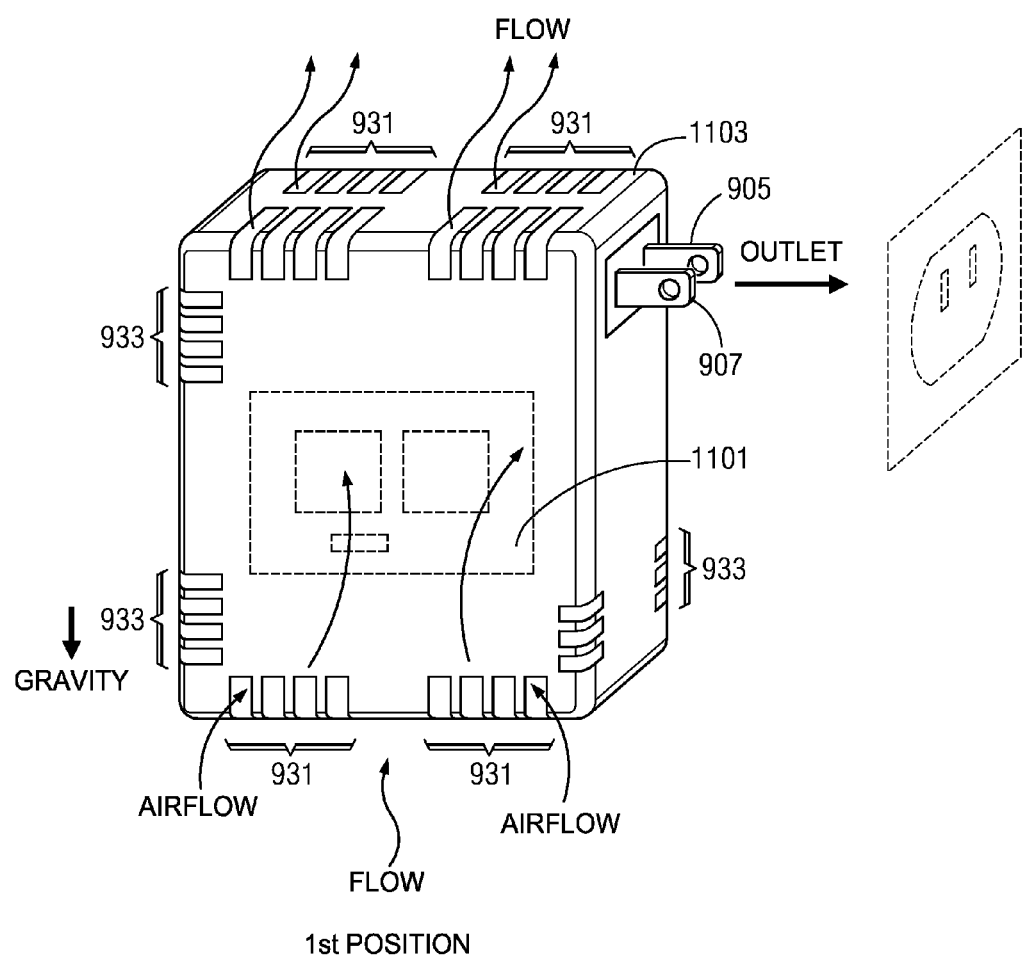
FIGS. 11 and 12 are simplified diagrams illustrating the power plug module according to a first position and a second position according to an embodiment of the present invention.
Figure 12:
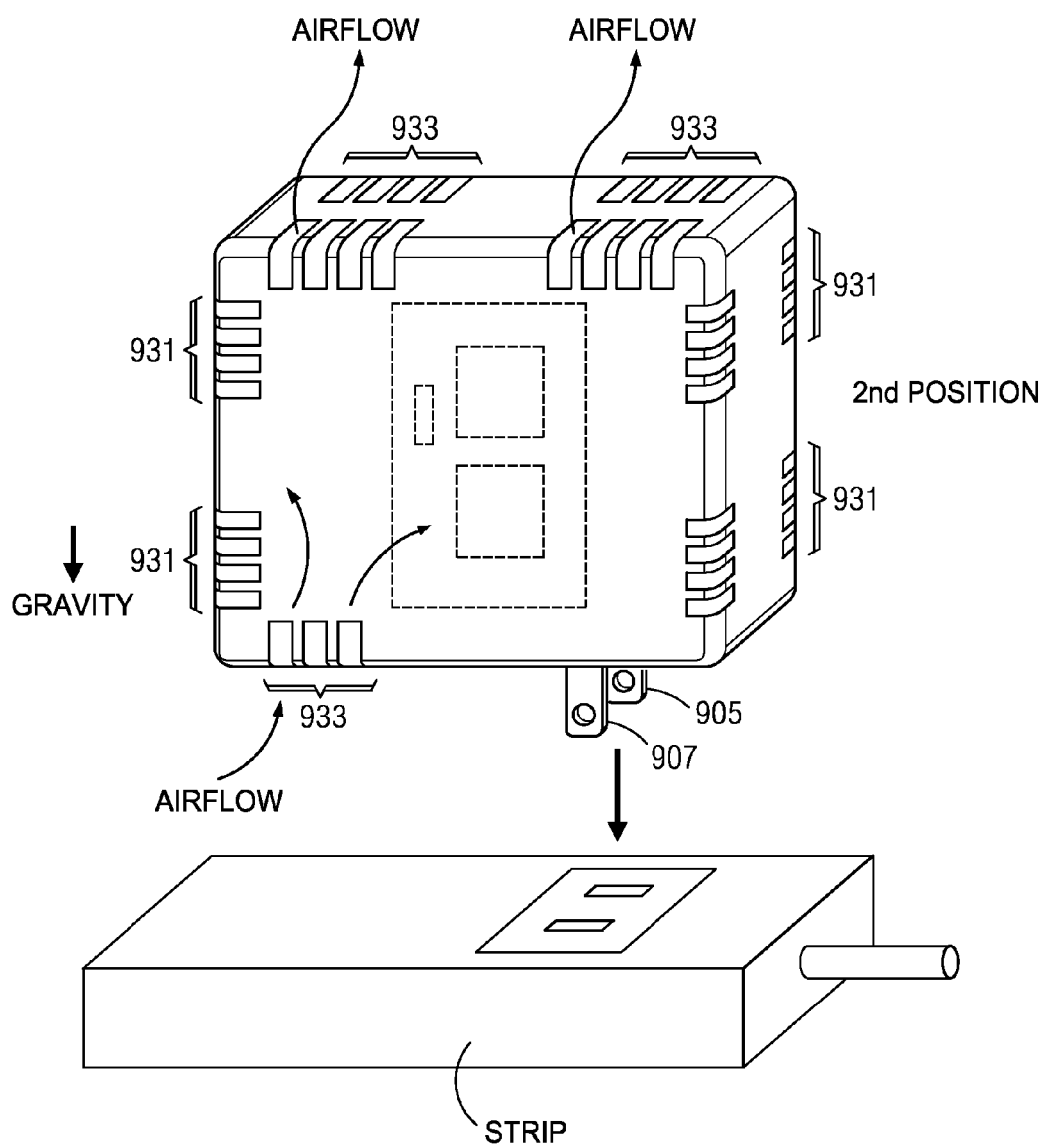

FIGS. 11 and 12 are simplified diagrams illustrating the power plug module according to a first position and a second position according to an embodiment of the present invention.

These diagrams are merely examples, which should not unduly limit the scope of the claims herein. One of ordinary skill in the art would recognize many variations, modifications, and alternatives. In a specific embodiment, the apparatus has an electronic module 1101 having a planar region disposed within an inner region of the housing 1103. The planar region is characterized by module width and a module length of the planar region according to a specific embodiment. The planar region is substantially parallel to a surface region defined by the width and the length of the removable housing member. In a specific embodiment, the electronic module has a power line device adapted to process a data signal from a first format to a second format, and may have one or more other elements and/or devices that have been described throughout the present specification.

In a specific embodiment, the present apparatus has a first set of air inlets and air outlets 931 (e.g., openings) provided to allow thermal energy to traverse through the inner region and along the planar region of the electronic module while the first prong 907 and the second prong 905 are provided in a first power line outlet in a first direction, as illustrated by FIG. 11. In a specific embodiment, the apparatus has a second set of air inlets and air outlets 933 provided to allow thermal energy to traverse through the inner region and along the planar region of the electronic module while the first prong 907 and the second prong 905 are provided in a second power line outlet in a second direction, as illustrated by FIG. 12. That is, the first set may also include openings from the second set and the other way around according to a specific embodiment. Depending upon the embodiment, there can also be other elements as well as other variations, modifications, and alternatives.

Figure 13:
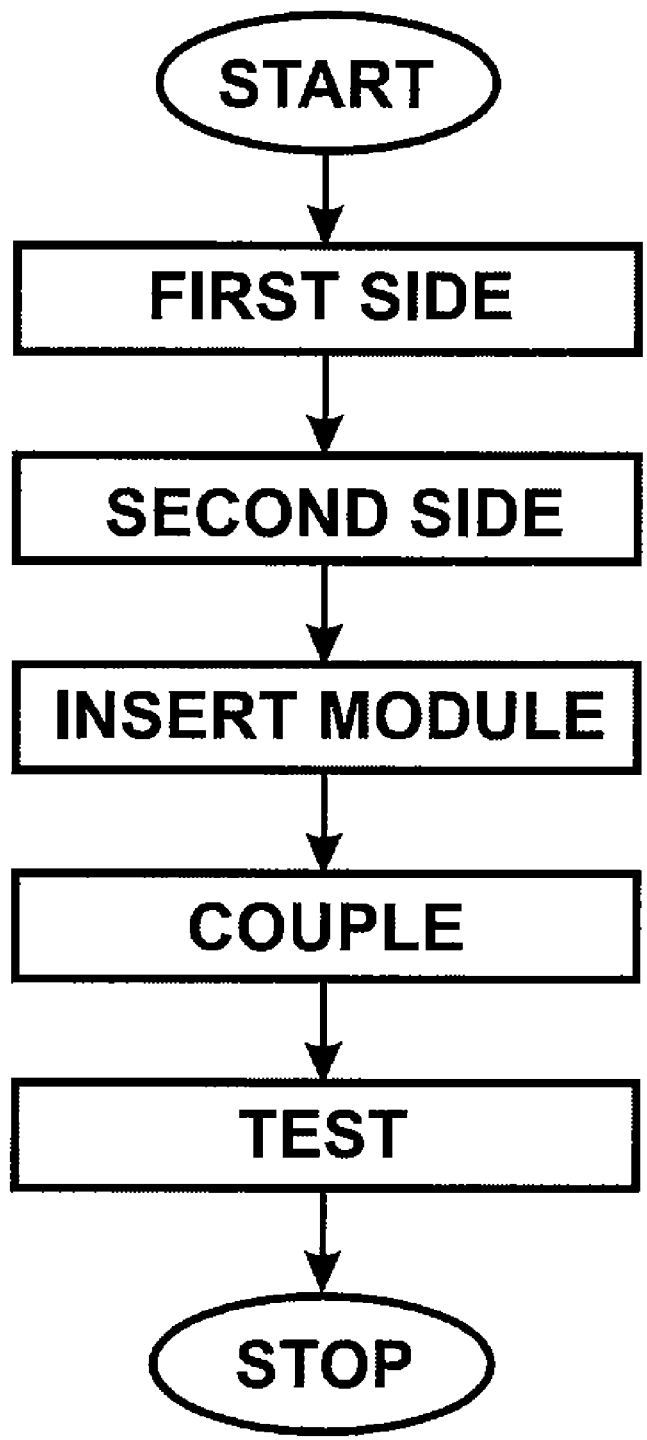
FIG. 13 is a simplified flow diagram illustrating an assembly of the power plug module according to an embodiment of the present invention.

FIG. 13 is a simplified flow diagram illustrating an assembly of the power plug module according to an embodiment of the present invention. This diagram is merely an example, which should not unduly limit the scope of the claims herein. One of ordinary skill in the art would recognize many variations, alternatives, and modifications. As shown, the assembly method includes providing a first side of the housing, a second side of the housing, a first prong, a second prong, and an electronic module. The first prong and second prong are fitted into a slot of the first side of the removable housing. Installing the first prong and second prong at this juncture (assembly stage) as opposed to the molding stage provides the advantage of reducing inventory levels. The first prong and second prong are adapted to couple into a power line outlet. In a preferred embodiment, the first prong and the second prong can be physically inserted into one or more different power outlets, e.g., U.S. standard, China standard, European standard, Japan standard. The electronic module is inserted between the two housing sides and coupled to the first prong and the second prong. The two housing sides are coupled together to form the completed assembly. In a preferred embodiment, the first side of the housing and the second side of the housing are coupled together by a clipping mechanism. Depending on the application, other method of coupling housing may be used, such as gluing, soldering, etc.

After assembly, the module is tested according to a specific embodiment. Further details of the assembly method can be found throughout the present specification and more particularly below.

FIGS. 14 through 17 are simplified diagrams illustrating the assembly of the power plug module according to an embodiment of the present invention. These diagrams are merely examples, which should not unduly limit the scope of the claims herein. One of ordinary skill in the art would recognize many variations, modifications, and alternatives.

FIGS. 14 and 15 shows two sides of an assembly according to an embodiment of the present invention. As shown in FIG. 14, a first side of the assembly is adapted to have a modular interface component. For example, the modular interface component is configured to couple to a power plug, which various from country to country. For example, in Hong Kong a three-prong interface is needed while in the U.S. a two-prong interface in a different configuration is needed. The two sides in FIGS. 14 and 15 include openings to have different interface components to be positioned into. For example, the openings at these sides are structured according to a standard size to accept interface components. As explained above, during the manufacturing process, it is determined as what the interface components are to be used. The selected interface module is then coupled to the two sides shown in FIGS. 14 and 15.

FIG. 16 shows an electronic module according to an embodiment of the present invention. As shown, the electronic module includes various electronic components and/or processors. For example, the electronic module is configured to process data to perform power line communication.

FIG. 17 illustrates an assembled power plug module. As shown, the module includes an interface for power plug. The electronic module is positioned inside the module. For example, the power plug module includes insulation for the electronic module to protect it from interference.

One or more benefits can be achieved using the present invention over conventional techniques. The present invention can be applied using conventional components from computer networking and hardware technologies. Additionally, the invention can be applied to pre-existing power line structures without substantial modification. Preferably, the present system and method are easy to implement and also allows for power line networking capabilities and power plug abilities using the same apparatus according to a specific embodiment. In a preferred embodiment, the present invention can provide an improved power line device that has multiple air inlets/outlets for thermal management of the internal components, e.g., powerline chip. In a specific embodiment, the device can be adapted to communicate at high data rates, e.g., 200 Megabits per second and greater. In a specific embodiment, the powerline may use the HomePlug AV Standard provided by the HomePlug® Powerline Alliance, Inc., which is hereby incorporated by reference for all purposes. Alternatively, powerline may be subject to original Homeplug Powerline Alliance, Inc. standard or others depending upon the specific embodiment. Depending upon the embodiment, one or more of these benefits may exist. These and other benefits have been described throughout the present specification and more particularly below.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A plug in power line module apparatus comprising:
   a removable housing member, the removable housing member including an outer region and an inner region, the housing member having a width, a length, and a depth;
   a first prong and a second prong extending from the removable housing member, the first prong and the second prong being adapted to couple into a power line outlet;

a communication port coupled to the first prong and the second prong, the communication port adapted to send or receive data signals;

a spatial volume provided by the width, length, and depth of the housing member;

an electronic module having a planar region disposed within the inner region, the planar region being characterized by a module width and a module length, the planar region being substantially parallel to a surface region defined by the width and the length of the removable housing member, the electronic module comprising at least a power line device adapted to process a data signal from a first format to a second format;

a first set of air inlets and air outlets provided to allow thermal energy to traverse through the inner region and along the planar region of the electronic module while the first prong and the second prong are provided in a first power line outlet in a first direction; and a second set of air inlets and air outlets provided to allow thermal energy to traverse through the inner region and along the planar region of the electronic module while the first prong and the second prong are provided in a second power line outlet in a second direction.

2. The apparatus of claim 1 wherein the communication port comprises an Ethernet port.

3. The apparatus of claim 1 wherein the communication port comprises a VoIP port.

4. The apparatus of claim 1 further comprising a noise cancellation filter coupled to the first prong and the second prong.

5. The apparatus of claim 1 further comprising a noise cancellation filter coupled to the first prong and the second prong, the noise cancellation filter being adapted to remove high frequency noise ranging from about 1 Mega-Hertz to about 20 Mega-Hertz, the high frequency noise being derived through one or more AC outlets.

6. The apparatus of claim 1 wherein first prong and the second prong are provided on a detachable member coupled to the removable housing.

7. The apparatus of claim 1 wherein the removable housing member is made of a rigid plastic material.

8. The apparatus of claim 1 wherein the removable housing member comprises a first side coupled to a second side, the electronic module being mounted between the first side and the second side.

9. The apparatus of claim 1 wherein the first format is an OFDM format.

10. The apparatus of claim 1 wherein the data signal are characterized by a bit rate of 200 Mbps and greater.

11. A plug in power line module apparatus comprising:
a removable housing member, the removable housing member including an outer region and an inner region;

a first prong and a second prong extending from the removable housing member, the first prong and the second prong being adapted to couple into a power line outlet;

a communication port coupled to the first prong and the second prong, the communication port adapted to send or receive data signals;

an electronic module comprising at least a power line device adapted to process a data signal from a first format to a second format and having a planar region disposed within the inner region;

a first set of air inlets and air outlets provided to allow thermal energy to traverse through the inner region and along the planar region of the electronic module while the first prong and the second prong are provided in a first power line outlet in a first direction; and a second set of air inlets and air outlets provided to allow thermal energy to traverse through the inner region and along the planar region of the electronic module while the first prong and the second prong are provided in a second power line outlet in a second direction.

12. The apparatus of claim 11, wherein the communication port comprises an Ethernet port.

13. The apparatus of claim 11, wherein the communication port comprises a Voice over Internet Protocol (VoIP) port.

14. The apparatus of claim 11, further comprising a noise cancellation filter coupled to the first prong and the second prong.

15. The apparatus of claim 11, further comprising a noise cancellation filter coupled to the first prong and the second prong and adapted to remove high frequency noise ranging from about 1 Mega-Hertz to about 20 Mega-Hertz, the high frequency noise being derived through one or more alternating current (AC) outlets.

16. The apparatus of claim 11, wherein first prong and the second prong are provided on a detachable member coupled to the removable housing.

17. The apparatus of claim 11, wherein the removable housing member is made of a rigid plastic material.

18. The apparatus of claim 11, wherein the removable housing member comprises a first side coupled to a second side, the electronic module being mounted between the first side and the second side.

19. The apparatus of claim 11, wherein the first format is an orthogonal frequency-division multiplexing (OFDM) format.

20. The apparatus of claim 11, wherein the data signal are characterized by a bit rate of 200 Mbps and greater.

* * * * *